United States Patent [19]

Hsu et al.

[11] Patent Number: 5,061,765
[45] Date of Patent: Oct. 29, 1991

[54] PROCESS FOR THE SYNTHESIS OF A HIGH VINYL ISOPRENE-BUTADIENE COPOLYMER

[75] Inventors: Wen-Liang Hsu, Copley; Adel F. Halasa, Bath, both of Ohio

[73] Assignee: The Goodyear Tire & Rubber Company, Akron, Ohio

[21] Appl. No.: 601,103

[22] Filed: Oct. 22, 1990

[51] Int. Cl.$^5$ .......................... C08F 4/52; C08F 236/06
[52] U.S. Cl. ...................................... 526/141; 526/91; 526/92; 526/337
[58] Field of Search .................. 526/92, 93, 141, 337, 526/91

[56] References Cited

U.S. PATENT DOCUMENTS

| | | | |
|---|---|---|---|
| 3,678,022 | 7/1972 | Bozik et al. | 526/141 |
| 3,686,158 | 8/1972 | Bouton et al. | 526/173 X |

FOREIGN PATENT DOCUMENTS

| | | | |
|---|---|---|---|
| 0128726 | 8/1982 | Japan | 526/337 |
| 1153048 | 5/1969 | United Kingdom | 526/337 |

OTHER PUBLICATIONS

Sun and Wang, 2 Acta Polymerica Sinica 145 (1988).

*Primary Examiner*—Fred Teskin
*Attorney, Agent, or Firm*—Alvin T. Rockhill

[57] ABSTRACT

Isoprene-butadiene copolymers having high vinyl contents can be synthesized in organic solvents to high yields after short polymerization times by utilizing the process of this invention. The isoprene-butadiene copolymers made utilizing the process of this invention have a glass transition temperature which is within the range of about 0° C. to about −60° C. and can be employed in tire treads which provide improved traction and improved cut growth resistance. This invention specifically discloses a process for the synthesis of isoprene-butadiene copolymers having a high vinyl content which comprises copolymerizing isoprene monomer and butadiene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

20 Claims, No Drawings

PROCESS FOR THE SYNTHESIS OF A HIGH VINYL ISOPRENE-BUTADIENE COPOLYMER

BACKGROUND OF THE INVENTION

A technique for preparing crystallizable 3,4-polyisoprene is disclosed by Sun and Wang, 2 Acta Polymerica Sinica 145 (1988). These Chinese researchers disclose that crystalline 3,4-polyisoprene containing about 70% 3,4-microstructure and about 30% cis-1,4-microstructure can be prepared using a catalyst system containing iron acetyl acetonate, a trialkyl aluminum compound, and an amine modifier in benzene. However, the utilization of this catalyst system developed by the Chinese results in the formation of gel and poor yields.

Various catalyst systems and procedures have been used to copolymerize 1,3-butadiene and isoprene. However, such techniques typically do not result in the formation of random isoprene-butadiene rubbers which have high vinyl contents. Nevertheless, it would be desirable to employ such random isoprene-butadiene rubbers in many applications, such as tire tread compounds.

SUMMARY OF THE INVENTION

By utilizing the catalyst system and techniques of this invention random isoprene-butadiene copolymer rubbers can be synthesized. These isoprene-butadiene rubbers have high vinyl contents. In other words, these isoprene-butadiene rubbers contain a high amount of 1,2-polybutadiene repeat units and 3,4-polyisoprene repeat units. The glass transition temperature of these isoprene-butadiene rubbers will generally be within the range of about 0° C. to about −60° C. These isoprene-butadiene rubbers can be employed in building tires which have improved traction, rolling resistance, and abrasion resistance.

The subject invention specifically reveals a process for the synthesis of isoprene-butadiene rubbers having a high vinyl content which comprises copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound: wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

The present invention further discloses a process for the synthesis of isoprene-butadiene rubbers which comprises: (1) adding a catalyst system which is comprised of (a) an organoiron compound, (b) an organoaluminum compound, (c) a chelating aromatic amine, and (d) a protonic compound: wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1 to a polymerization medium containing isoprene monomer, 1,3-butadiene monomer and an organic solvent, and (2) allowing the isoprene monomer and 1,3-butadiene monomer to copolymerize at a temperature which is within the range of about −10° C. to about 100° C.

DETAILED DESCRIPTION OF THE INVENTION

The catalyst systems of this invention are comprised of (a) an organoiron compound, (b) an organoaluminum compound, (c) a chelating aromatic amine, and (d) a protonic compound. The organoiron compound will be soluble in the organic solvent used in the polymerization medium with the iron being in the +3 oxidation state. Some representative examples of suitable organoiron compounds include ferric benzoate, ferric acetate, ferric naphthenate, ferric octanoate, ferric neodecanoate, ferric palmitate, ferric stearate, ferric acetylacetonate, ferric salicaldehyde, ferric diglyoxime, ferric tetracarbonyl, ferric 2-ethylhexanoate, ferrocene and alkylferrocenes.

The organoaluminum compounds that can be utilized will typically be of the structural formula:

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl auminum, ethyl diphenyl aluminum. ethyl di-p-tolyl aluminum, ethyl dibenzyl aluminum, diethyl phenyl aluminum, diethyl p-tolyl aluminum, diethyl benzyl aluminum and other triorganoaluminum compounds. Trialkylaluminum compounds are generally preferred. The preferred trialkylaluminum compounds include triethyl aluminum (TEAL), tri-n-propyl aluminum, triisobutyl aluminum (TIBA), trihexyl aluminum, diisobutyl aluminum hydride (DIBA-H), and diethyl aluminum fluoride.

A wide variety of chelating aromatic amines can be utilized in the catalyst systems of this invention. The chelating aromatic amine will typically be a chelating aromatic diamine. Some representative examples of suitable chelating aromatic amines include 1,10-phenanthroline, 2,2'-bipyridine, 2,2', 2''-terpyridine, cyanopyridines, amino anilines, amino pyridines, nitroanilines, nitropyridines and 1,4-phenylenediamine.

The protonic compound will typically be water, an alcohol or a carboxylic acid. In most cases, it is preferred to utilize water as the protonic compound. However, methanol, ethanol, isopropyl alcohol, n-propyl alcohol, t-butanol, isobutyl alcohol, or n-butyl alcohol can also be employed. Higher alcohols can also be utilized as the protonic compound. A wide variety of carboxyl group containing compounds can also be utilized as the protonic compound. For instance, stearic acid can be used.

The ratio of the chelating aromatic amine to the organoiron compound in the catalyst system will typically be within the range of about 0.1:1 to about 1:1. The molar ratio of the chelating aromatic amine to the organoiron compound will preferably be within the range of about 0.2:1 to about 0.5:1. The molar ratio of the organoaluminum compound to the organoiron compound will typically be within the range of about 5:1 to about 200:1. It is normally preferred for the molar ratio of the organoaluminum compound to the organoiron compound to be within the range of about 20:1 to about 100:1. It is most preferred for the molar ratio of the organoaluminum compound to the organoiron compound to be within the range of about 40:1 to about 60:1. The molar ratio of the protonic compound to the organoaluminum compound will typically be within the range of about 0.001:1 to about 0.2:1. It is generally preferred for the ratio of the protonic compound to the organoaluminum compound to be within the range of 0.005:1 to about 0.1:1. It is most preferred for the molar ratio of the protonic compound to the organoaluminum compound to be within the range of about 0.01:1 to about 0.07:1.

The polymerizations of this invention will typically be carried out as solution polymerizations which are conducted in an organic solvent. The organic solvent can be an aromatic hydrocarbon or a saturated aliphatic hydrocarbon. Some representative examples of suitable aromatic solvents include benzene, toluene, xylenes, ethylbenzene, diethylbenzene, isobutylbenzene, and the like. For environmental reasons aliphatic solvents are highly preferred. Some representative examples of suitable aliphatic solvents include n-hexane, cyclohexane, methylcyclohexane, isohexanes, n-heptane, n-octane, isooctanes, n-decane, 2,2-dimethylbutane, petroleum ether, kerosene, petroleum spirits, petroleum naphtha and the like. It is important for the organic solvent to be a liquid under the conditions (temperature and pressure) utilized for the polymerization.

Such solution polymerizations are carried out in a polymerization medium which is comprised of the organic solvent, 1,3-butadiene monomer, and isoprene monomer. Such polymerization mediums will typically contain from about 5 weight percent to about 35 weight percent monomers, based upon the total weight of the polymerization medium. It is typically preferred for the polymerization medium to contain from about 10% to about 30% monomer. It is generally more preferred for the polymerization medium to contain from about 15 weight percent to about 25 weight percent monomers. As the polymerization proceeds, monomer will be converted to polymer. Accordingly, the polymerization medium will typically contain from about 5 weight percent to about 35 weight percent monomers and polymer, based upon the total weight of the polymerization medium.

The polymerizations of this invention can be carried out as a batch process, on a semi-continuous basis, or on a continuous basis. In any case, the polymerization is initiated by adding the catalyst system to the monomer containing polymerization medium. The four component catalyst system can be added to the polymerization medium as a premix or it can be prepared in situ. It is typically preferred to prepare a premix of the protonic compound with the organoaluminum compound. It has been found that it is most desirable to add the monomers to the polymerization medium first and then to add the organoiron compound and the chelating aromatic amine with a preformed protonic compound/organoaluminum compound component being added last.

Such polymerizations are typically conducted at a temperature which is within the range of $-10°$ C. to about 100° C. It is generally preferred for the polymerization to be carried out at a temperature which is within the range of about 0° C. to about 50° C. It is most preferred for such polymerizations to be conducted at a temperature which is within the range of 10° C. to 30° C.

By utilizing the catalyst systems of this invention, high conversions can be reached after relatively short polymerization times. Additionally, virtually no gelation occurs when the catalyst systems of this invention are employed.

After the polymerization has been completed, the isoprene-butadiene rubber produced can be recovered utilizing standard techniques. In most cases, it will be desirable to utilize a coagulation technique in recovering the isoprene-butadiene copolymer rubber. It will generally be desirable to remove residual organic solvent from the polymer by evaporation which can be facilitated by the application of vacuum and elevated temperatures.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES 1-9

Fifty-seven grams of column dried monomer premix (18% in hexane) was charged to a 4 oz. (118 ml.) bottle. The composition of the monomer premix is shown in Table I. Ferric acetylacetonate (0.015 mmoles) and 1,10-phenanthroline was added at a molar ratio of 2:1 followed by the addition of hydrolyzed TIBA (0.30 mmoles). The molar ratio of water to TIBA utilized in making the hydrolyzed TIBA was 0.06:1. The molar ratio of the TIBA to the ferric acetylacetonate used in this experiment was 20:1. The polymerization was carried out at about 22° C. for 2 hours. A shortstop solution consisting of methanol, rosin acid, triisopropanolamine, and an antioxidant was then added to quench the polymerization and also to stabilize the polymer formed. After evaporating hexane, the polymer was dried in a vacuum oven at 50° C. overnight. The glass transition temperatures and microstructures of the polymers synthesized is shown in Table I.

TABLE I

| Example | Monomer Premix Isoprene/butadiene | Glass Transition Temperature | 1,2-polybutadiene Repeat Units | 3,4-polyisoprene Repeat Units |
| --- | --- | --- | --- | --- |
| 1 | 90/10 | −8° C. | 6% | 70% |
| 2 | 80/20 | −14° C. | 10% | 63% |
| 3 | 70/30 | −21° C. | 15% | 55% |
| 4 | 60/40 | −35° C. | 20% | 46% |
| 5 | 50/50 | −36° C. | 25% | 40% |
| 6 | 40/60 | −44° C. | 29% | 33% |
| 7 | 30/70 | −48° C. | 35% | 24% |
| 8 | 20/80 | −52° C. | 41% | 16% |
| 9 | 10/90 | −56° C. | 45% | 9% |

As can be seen, the glass transition temperature of the polymer could be controlled by varying the ratio of isoprene to butadiene. The yield obtained in this series of experiments was greater than about 85%. These copolymers which contained from 5% to 95% isoprene and from 5% to 95% butadiene had high vinyl contents (sums of 1,2-polybutadiene repeat units and 3,4-polyisoprene units) which were within the range of 54% to 76%. In most cases the isoprene-butadiene rubber will contain from about 30% to about 70% isoprene and from about 30% to about 70% butadiene.

As a general rule, vinyl contents can be increased by increasing the ratio of the organoaluminum compound to the organoiron compound. However, higher ratios of the organoaluminum compound to the organoiron compound normally result in lower conversions.

EXAMPLE 10

The procedure utilized in Example 3 was repeated in this experiment except that the molar ratio of TIBA to ferric acetylacetonate was increased to 50:1. The polymer yield was reduced to about 60% with the total vinyl content being 78%. The isoprene-butadiene rubber made had a glass transition temperature of −13° C. with its microstructure being 22% 1,2-polybutadiene, 11% 1,4-polybutadiene, 56% 3,4-polyisoprene, and 11% 1,4-polyisoprene.

While certain representative embodiments and details have been shown for the purpose of illustrating the subject invention, it will be apparent to those skilled in this art that various changes and modifications can be made therein without departing from the scope of the subject invention.

What is claimed is:

1. A process for the synthesis of isoprene-butadiene rubbers having a high vinyl content which comprises copolymerizing isoprene monomer and 1,3-butadiene monomer in an organic solvent at a temperature which is within the range of about −10° C. to about 100° C. in the presence of a catalyst system which is comprised of (a) an organoiron compound which is soluble in the organic solvent, wherein the iron in the organoiron compound is in the +3 oxidation state, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

2. A process as specified in claim 1 wherein the organic solvent is an aliphatic organic solvent.

3. A process as specified in claim 2 wherein the aliphatic organic solvent is selected from the group consisting of hexane and cyclohexane.

4. A process as specified in claim 1 wherein the organoiron compound is utilized at a level which is within the range of about 0.001 phm to about 1 phm.

5. A process as specified in claim 1 wherein the organoiron compound is employed at a level which is within the range of about 0.005 phm to about 0.1 phm.

6. A process as specified in claim 1 wherein the organoiron compound is employed at a level which is within the range of about 0.01 phm to about 0.03 phm.

7. A process as specified in claim 4 wherein said polymerization is carried out at a temperature which is within the range of about 0° C. to about 50° C.

8. A process as specified in claim 5 wherein said polymerization is carried out at a temperature which is within the range of about 10° C. to about 30° C.

9. A process as specified in claim 1 wherein the molar ratio of the chelating amine to the organoiron compound is within the range of about 0.2:1 to about 0.5:1; wherein the molar ratio of the organoaluminum compound to the organoiron compound is within the range of about 40:1 to about 60:1: and wherein the molar ratio of the protonic compound to the organoaluminum compound is within the range of about 0.01:1 to about 0.07:1.

10. A process as specified in claim 9 wherein the organoaluminum compound is triisobutyl aluminum, wherein the organoiron compound is ferric acetyl acetonate, wherein the chelating aromatic amine is 1,10-phenanthroline, and wherein the protonic compound is water.

11. A process as specified in claim 1 wherein the organoaluminum compound is a trialkyl aluminum compound.

12. A process for the synthesis of isoprene-butadiene rubbers which comprises: (1) adding a catalyst system which is comprised of (a) an organoiron compound which is soluble in the organic solvent, wherein the iron in the organoiron compound is in the +3 oxidation state, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1 to a polymerization medium containing isoprene monomer, 1,3-butadiene monomer, and an aliphatic organic solvent, and (2) allowing the isoprene monomer and butadiene monomer to copolymerize at a temperature which is within the range of about −10° C. to about 100° C.

13. A process as specified in claim 9 wherein the organoiron compound component and the chelating aromatic amine component of the catalyst system are added first followed by addition of the organoaluminum compound which has been premixed with the protonic compound.

14. A process for the synthesis of isoprene-butadiene rubbers having a high vinyl content which comprises copolymerizing isoprene monomer and 1,3-butadiene monomer in an organic solvent at a temperature which is within the range of about −10° C. to about 100° C. in the presence of a catalyst system which is comprised of (a) an organoiron compound, wherein the organoiron compound is selected from the group consisting of ferric benzoate, ferric acetate, ferric naphthenate, ferric octanoate, ferric neodecanoate, ferric palmitate, ferric stearate, ferric acetylacetonate, ferric salicaldehyde, ferric diglyoxime, and ferric tetracarbony, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

15. A process as specified in claim 12 wherein the chelating aromatic amine is selected from the group consisting of 1,10-phenanthroine, 2,2-dipyridyl, and 1,4-phenylenediamine.

16. A process as specified in claim 13 wherein the protonic compound is selected from the group consisting of water, methanol, ethanol, isopropyl alcohol and normal propyl alcohol.

17. A process as specified in claim 14 wherein the molar ratio of the chelating aromatic amine to the organoiron compound is within the range of about 0.2:1 to about 0.5:1: wherein the molar ratio of the organoaluminum compound to the organoiron compound is within the range of about 20:1 to about 100:1: and wherein the molar ratio of the protonic compound to the organoaluminum compound is within the range of about 0.005:1 to about 0.1:1.

18. A process as specified in claim 15 wherein the trialkyl aluminum compound is selected from the group consisting of triethyl aluminum, tri-n-propyl aluminum, triisobutyl aluminum and trihexyl aluminum.

19. A process as specified in claim 16 wherein the molar ratio of the organoaluminum compound to the organoiron compound is within the range of about 40:1 to about 60:1; and wherein the molar ratio of the protonic compound to the organoaluminum compound is within the range of about 0.01:1 to about 0.07:1.

20. A process as specified in claim 17 wherein the organoaluminum compound is triisobutylaluminum.

* * * * *